United States Patent
Kuhl et al.

(10) Patent No.: US 9,045,081 B2
(45) Date of Patent: Jun. 2, 2015

(54) DEVICE AND METHOD FOR ADJUSTING THE HEADLIGHT RANGE OF A MOTOR VEHICLE

(75) Inventors: Patrick Kuhl, Munich (DE); Frank Bilz, Munich (DE); Jens Hewerer, Karlsfeld (DE); Karl Naab, Woerth (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 647 days.

(21) Appl. No.: 11/498,758

(22) Filed: Aug. 4, 2006

(65) Prior Publication Data

US 2007/0025112 A1    Feb. 1, 2007

Related U.S. Application Data

(63) Continuation of application No. PCT/EP2005/001086, filed on Feb. 3, 2005.

(30) Foreign Application Priority Data

Feb. 7, 2004   (DE) .................... 10 2004 006 133

(51) Int. Cl.
| | |
|---|---|
| *B60Q 1/26* | (2006.01) |
| *G08B 21/00* | (2006.01) |
| *B60R 25/10* | (2013.01) |
| *B60Q 1/00* | (2006.01) |
| *G01C 9/00* | (2006.01) |

(Continued)

(52) U.S. Cl.
CPC ............ *B60Q 1/10* (2013.01); *B60Q 2300/056* (2013.01); *B60Q 2300/112* (2013.01); *B60Q 2300/114* (2013.01); *B60Q 2300/132* (2013.01); *B60Q 2300/146* (2013.01); *B60Q 2300/324* (2013.01); *B60Q 2300/41* (2013.01); *B60Q 2300/42* (2013.01)

(58) Field of Classification Search
USPC ......................................................... 340/469
See application file for complete search history.

(56) References Cited

U.S. PATENT DOCUMENTS

| | | | |
|---|---|---|---|
| 4,768,135 A | | 8/1988 | Kretschmer et al. |
| 5,331,251 A | * | 7/1994 | Marois ............................ 315/82 |

(Continued)

FOREIGN PATENT DOCUMENTS

| | | |
|---|---|---|
| DE | 42 01 146 A1 | 7/1992 |
| EP | 1 028 025 A2 | 8/2000 |

(Continued)

OTHER PUBLICATIONS

German Search Report dated Apr. 14, 2004 with an English translation of the pertinent portions (Fourteen (14) pages).

(Continued)

*Primary Examiner* — Jennifer Mehmood
*Assistant Examiner* — John Mortell
(74) *Attorney, Agent, or Firm* — Crowell & Moring LLP

(57) ABSTRACT

The invention relates to a device for automatically adjusting the headlight range of a motor vehicle, comprising at least vertically adjustment headlights comprising a control unit provided with a sensor device which is used to detect vehicle and/or ambient data and an evaluation and control device which is used to determine control data for controlling the at least vertically adjustable headlights. The sensor device is embodied as a non-predictable working sensor which is used to detect the vertical roadway curving.

13 Claims, 3 Drawing Sheets

(51) Int. Cl.
*G01C 19/00* (2013.01)
*B60Q 1/10* (2006.01)

(56) References Cited

U.S. PATENT DOCUMENTS

| | | | |
|---|---|---|---|
| 5,408,411 A | | 4/1995 | Nakamura et al. |
| 5,633,710 A | * | 5/1997 | Kumra et al. ............ 356/139.08 |
| 5,868,488 A | * | 2/1999 | Speak et al. ..................... 362/37 |
| 5,877,680 A | * | 3/1999 | Okuchi et al. ................ 340/468 |
| 6,349,251 B1 | * | 2/2002 | Toda et al. ...................... 701/49 |
| 6,430,521 B1 | * | 8/2002 | Toda ............................. 702/150 |
| 6,459,476 B2 | * | 10/2002 | Nishimura .................. 356/5.01 |
| 6,478,457 B1 | * | 11/2002 | Manley ......................... 362/465 |
| 6,480,806 B1 | * | 11/2002 | Bilz et al. ..................... 702/154 |
| 6,663,268 B1 | * | 12/2003 | Toda et al. .................... 362/464 |
| 6,874,918 B2 | * | 4/2005 | Tawa et al. ................... 362/465 |
| 2002/0075691 A1 | * | 6/2002 | Couillaud et al. ............ 362/465 |
| 2003/0045984 A1 | | 3/2003 | Horii et al. |
| 2003/0107898 A1 | * | 6/2003 | Smith et al. .................. 362/465 |

FOREIGN PATENT DOCUMENTS

| | | |
|---|---|---|
| EP | 1 142 757 B1 | 10/2001 |
| EP | 0 869 031 B1 | 6/2003 |
| GB | 2 309 774 | 6/1997 |
| JP | 2001-341578 A | 11/2001 |
| WO | WO 03/053737 A1 | 7/2003 |

OTHER PUBLICATIONS

German Office Action dated Apr. 30, 2007 with English translation (Thirteen (13) pages).
International Search Report dated May 20, 2005.

* cited by examiner

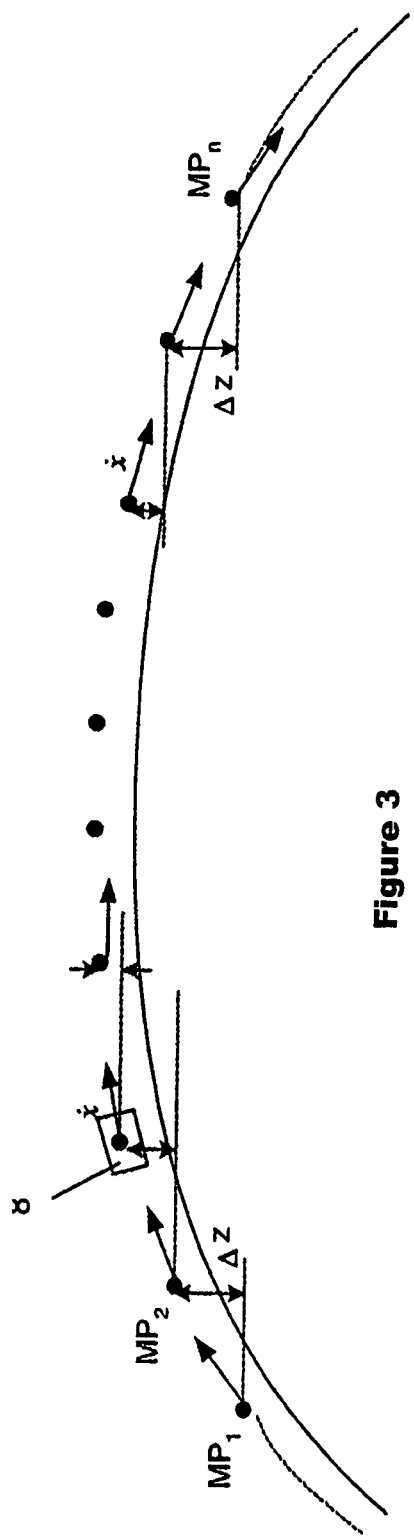

DEVICE AND METHOD FOR ADJUSTING THE HEADLIGHT RANGE OF A MOTOR VEHICLE

CROSS-REFERENCE TO RELATED APPLICATIONS

This application is a continuation of PCT International Application No. PCT/EP2005/001086, filed on Feb. 3, 2005, which claims priority under 35 U.S.C. §119 to German Application No. 10 2004 006 133.5, filed Feb. 7, 2004, the entire disclosures of which are expressly incorporated by reference herein.

BACKGROUND AND SUMMARY OF THE INVENTION

The invention relates to a device and method for adjusting the range of the headlights of a motor vehicle having at least one vertically adjustable headlight.

Various devices and methods are known for the automatic adjusting of the headlight range in the case of a motor vehicle. Thus, European Patent document EP 0 869 031 B1 describes a method of adjusting the range of motor vehicle headlights. In this document, information concerning the vehicle environment is collected by use of a video sensor and is analyzed by use of an analyzing unit, and the headlight range is adjusted as a function thereof, so that pitching motions of the vehicle or a corresponding loading of the vehicle can automatically be compensated in the headlight range.

Furthermore, a device for adjusting the lighting direction is known from German Patent document DE 197 03 664 C2, in which, as a function of the inclination of the vehicle in its driving direction, an automatic correction of the lighting direction is carried out.

European Patent document EP 0 230 620 B1 describes a headlight system for motor vehicles, in which the light distribution is adapted to the requirements in different traffic situations. For this purpose, the current traffic situation is compared with stored traffic situations by use of a computer, and the light distribution is controlled in the necessary manner by way of devices for changing the light distribution.

Furthermore, from the Special Edition "System Partners" of the Technical Journal *ATZ*, Year 2000, Article "Vision System for the Control of Headlights", Page 36, Chapter 5, "Controlling Light Distributions", it is known to improve automatic headlight range adjustments for traveling through depressions and traveling over hilltops by use of sensors operating in a foresighted manner.

It is an object of the invention to further improve a device and a method of the above-mentioned type and to provide alternative solutions. The invention is based on the recognition that, despite the above-described devices for the automatic adjustment of the headlight range and/or the existing devices for the automatic light distribution, the vehicles, in each case, as a function of the vehicle loading condition, as a function of pitching motions of the vehicle, or as a function of the imminent course of the curves of a road, do not ensure a sufficient illumination when traveling through road depressions or when driving over hilltops. A solution using the foresighted sensor system, as described in the above-mentioned article of the Special Edition of the Technical Journal *ATZ*, can be implemented only at correspondingly high costs.

According to the invention, the object is in each case achieved by a device and method for the automatic adjustment of the headlight range of a motor vehicle having at least one vertically adjustable headlight. The device includes a sensor device for recording vehicle and/or environment data, and an analyzing and control device for analyzing the vehicle and/or environment data and for determining, as a function thereof, control data for controlling the at least one vertically adjustable headlight wherein the sensor device is constructed as a sensor system, which does not operate in a foresighted manner, and by which the recording of a vertical road curvature can be implemented.

By means of the sensor device according to the present invention, which is not constructed as a foresighted sensor system, in a simple and cost-effective manner, by use of sensors already present in the vehicle as a rule (for example, sensors for recording the vehicle speed, sensors for recording the rotating rate about the transverse vehicle axis, sensors for recording the vehicle acceleration in the direction of the vertical axis of the vehicle, or sensors for recording the vehicle height with reference to a reference height or other sensors), a sufficiently precise determination of the current vertical road curvature may be implemented.

In a preferred embodiment of the invention, the sensor device has at least devices for recording the vehicle speed (such as sensors for recording the rotational wheel speed), as well as an inertial measuring system. In this case, the inertial measuring system also has at least one additional sensor, e.g., particularly an acceleration sensor. The acceleration sensor is used, in particular, for recording the vehicle rate of rotation (rotation of the vehicle about its horizontal transverse axis) and/or for recording the acceleration of the vehicle in the vertical direction (recording the geographic height change of the vehicle). As an alternative to the sensor for recording the vertical vehicle acceleration, a height sensor may also be used directly for determining the current height or the current change of height of the motor vehicle with respect to a reference point (for example, height change of the vehicle with respect to sea level). In the context of the invention, a sensor for recording the height is any sensor by which data concerning the actual height or height change of the vehicle can be determined with respect to a reference point. In this case, it is unimportant whether it is a mechanically constructed height sensor (such as a barometric height sensor) or a device which determines the height or height change by way of satellite or the like. The vertical road curvature can directly be calculated in a simple manner from the vehicle speed together with the rate of rotation of the vehicle about its transverse axis or the height change of the vehicle. A simple computation basis for determining the road curvature is obtained from the following formula:

$$K = \frac{1}{R}; \quad mitR = \frac{180°}{\pi} \times \frac{\dot{x}}{\dot{\phi}};$$

$\dot{x}$=vehicle speed in the driving direction or x-direction [unit: m/sec.], and $\dot{\phi}$=rate of rotation about the transverse axis of the vehicle y [unit: °/sec.].

By using level sensors (for example, for recording the vehicle distance from the road) in the chassis, lifting and pitching movements of the vehicle with respect to the road, as they regularly occur when driving over unevennesses, when accelerating or when braking the vehicle, can be filtered out of the data to be determined for calculating the road curvature.

As a further aspect of the invention, the sensor device without a foresighted operating sensor system may be expanded by a sensor system which does operate in a foresighted manner. This can, on the one hand, result in a corresponding redundancy of the system and, on the other hand, in a clear increase in its precision. In this case, the sensor system, which operates in a foresighted manner and by which the environment can be determined in the most precise fashion by recording environment data, is preferably constructed as a camera system. By use of the camera system, line-shaped objects, such as lane lines on the road, curb edges, surface structures and/or brightness or color transitions between the road surface and a surface beside the road, as well as sequences of regularly appearing objects, such as guide posts which appear in the area in front of the vehicle, can be recorded. Using the course of the recorded objects (for example, the shape of the course of at least two lane lines in the driving direction to the horizon), the vertical road curvature and/or the longitudinal inclination of the vehicle with respect to the road surface may be calculated.

As an alternative or in addition, additional systems operating in a foresighted manner are provided, for example, a navigation system, which has geographic height information of the environment (navigation system with 3D information), a photosensor device for recording the luminance on the road, or a system for emitting and processing, in particular, optical rays and their reflections.

A system operating on the basis of rays to be emitted and the reception of reflections of these rays can, for example, send rays to the road surface at different vertical angles in the forward driving direction and determine the distance of the road surface at these vertical angles either by measuring the propagation time of the rays from their emission to the reception of the reflections or by way of a triangulation method, and thereby determine the pitching motions of the vehicle as well as the vertical curvature of the road surface.

By way of a navigation system with height information with respect to all geographic location data, in connection with the current position information and the vehicle speed, all road curvatures can be computed. As an alternative, a navigation system may also have directly stored all road curvatures of listed routes, and these may then be used in connection with the position information, which can be retrieved by way of a satellite or other external sources (such as intelligent guide posts or the like), for the current adaptation of the headlight range.

Another aspect of the invention provides an arithmetic-logic unit (ALU) for checking the plausibility of the data of the sensor device for the recording of the road curvature. As a result, the data of sensor systems operating in a foresighted manner and/or not operating in a foresighted manner can be checked for accuracy and, in the event of the presence of a test result which is not plausible, the data can be rejected (or possibly newly determined or replaced by data for a defined standard adjustment). The following data are preferably used for a plausibility check:

navigation data,
values of the sensor system to be monitored which are recorded over a predefined time period and are stored, by means of which, for example, a determination of the currently traveled road (city, country road, turnpike, . . . ) is permitted,
individual data related to driving dynamics, or a combination of different data related to driving dynamics, such as vehicle speed, rate of rotation or acceleration about the transverse vehicle axis, distances between the road surface and a vehicle component (for example, the vehicle floor, vehicle axle front/rear), vertical vehicle acceleration (upward or downward), horizontal vehicle acceleration (in the driving direction or against the driving direction), height of the vehicle with respect to a reference height, or any combination of the indicated data sources.

The arithmetic-logic unit for the plausibility check is preferably constructed as a component of an analyzing and control device.

When a redundantly constructed sensor system is present and a fault is recorded in a system, a switching-over may also take place to the still remaining fault-free sensor system.

Furthermore, the sensor device for recording the vehicle data and/or environment data may be constructed to be adjustable at least by way of individual sensor components, particularly such that an alignment of the sensor device or of individual components of the sensor device may be carried out as a function of additional vehicle and/or environment data. Preferably, the sensor device or components thereof may be adjustable or alignable as a function of the control behavior or triggering behavior of an existing cornering light control.

Devices for the recording of oncoming motor vehicles and/or of motor vehicles driving ahead may also be present. As a function of a such a recording, a switching-over of the headlights can take place from the low beam (in this operating condition, the activity of the object of the invention will have priority) to the high beam, or the low beam can be adjusted into a laterally or vertically changed position, particularly a position with a larger or smaller headlight range.

The invention also relates to a method of adjusting the range of headlights in a motor vehicle, in which case the headlights are set and/or horizontally adjusted by way of a control device and an adjusting mechanism in their headlight axis to a certain headlight range. A sensor device collects and provides information concerning the current operating condition of the vehicle and/or the current environmental conditions and the headlight setting is automatically adjusted in its headlight range as a function of the provided information.

According to the invention, by use of the information collected and provided by the sensor device, the vertical curvature of the currently traveled road section is determined by the analyzing and control device and the headlight range is adjusted as a function thereof.

In accordance with the invention, advantageously all types of vertical road curvatures (as well as curvatures on a horizontally extending road as well as curvatures on an ascending or on a descending road) may be determined, and an adjustment of the headlight range can be adapted thereto.

Other objects, advantages and novel features of the present invention will become apparent from the following detailed description of the invention when considered in conjunction with the accompanying drawings.

BRIEF DESCRIPTION OF THE DRAWINGS

FIG. 3 is also a view according to FIG. 1, where the recording of a curvature takes place on the basis of the recorded vehicle speed in connection with a recorded height or height change of the vehicle.

DETAILED DESCRIPTION OF THE DRAWINGS

Figure 1:
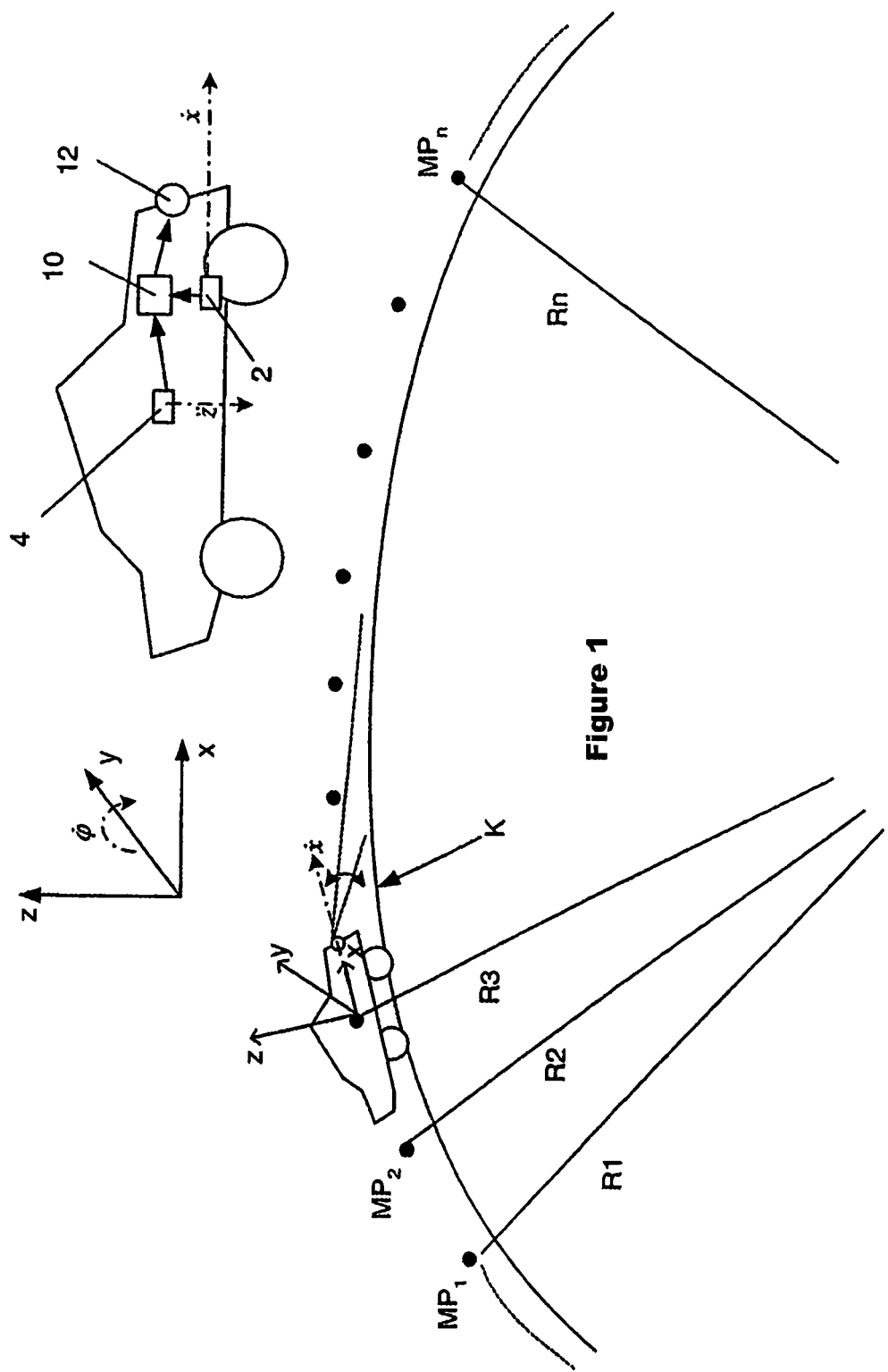
FIG. 1 is a diagrammatic view of a motor vehicle driving over a hilltop on a road.

FIG. 1 schematically illustrates a motor vehicle driving on a road over a hilltop, the road having a certain road curvature K. For illustrating the values to be recorded by way of a sensor system, a system of coordinates is schematically outlined (x-axis: driving direction/longitudinal vehicle axis; y-axis:

transverse vehicle axis; z-axis: vertical vehicle axis). In a preferred embodiment of the invention, the sensor system records at least the vehicle speed x in the driving direction (x-direction), as well as the rate of rotation $\dot{\phi}$ (rotation of the vehicle about its transverse axis y) of the vehicle. The recording of the vehicle speed $\dot{x}$ may, for example, take place by use of a vehicle speed sensor 2 which records the rotational wheel speed, while the recording of the rate of rotation $\dot{\phi}$ can be carried out by use of a rate of rotation sensor 4.

As an alternative or in addition to the recording for the rate of rotation $\dot{\Phi}$, the height z or the height change Δz (FIG. 3) of the vehicle can also be recorded and be used in connection with the vehicle speed $\dot{x}$ for determining the radius R (e.g., $R_1$, $R_2 \ldots R_n$) or the road curvature K. In this case, the determination or recording of the vehicle height z can take place, for example, by means of a vertical acceleration sensor 6 (FIG. 2) by recording the vertical acceleration $\ddot{z}$ in an indirect manner or by means of a altimeter 8 (FIG. 3) in a direct manner.

For determining of the road curvature K, the recorded sensor data are transmitted to the analyzing and control device 10. After the determination of the road curvature K, a signal for controlling the headlight unit 12 is determined as a function of the latter—by way of the analyzing and control device—and is emitted to the headlight unit 12 or its adjusting mechanism.

Figure 2:
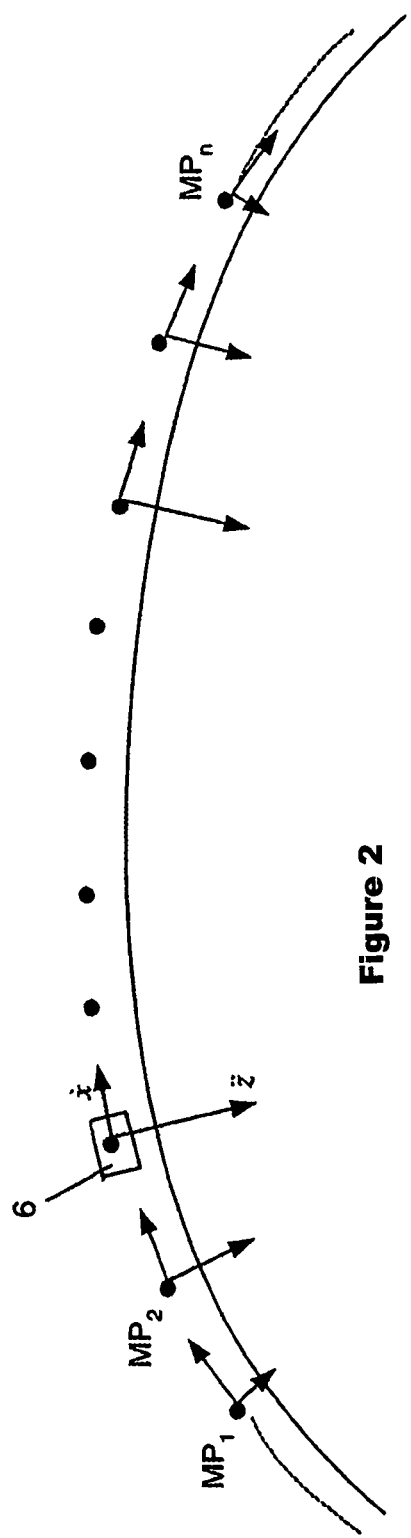
FIG. 2 is a view according to FIG. 1, where the recording of a curvature takes place on the basis of the recorded vehicle speed in connection with the vertical vehicle acceleration.

As illustrated in FIGS. 1-3, the data of the sensor system to be monitored, at measuring points $MP_1$, $MP_2 \ldots MP_n$, with associated radii $R_1$, $R_2 \ldots R_n$, spaced with respect to time or geography, are queried and analyzed. From the plurality of the determined data, the median radius R or the median curvature K of the traveled hilltop road or the just traveled hilltop road section can be computed. By means of these data and estimation of the subsequent course of the curvature can also take place with high precision. In order to be able to compute a curvature without salient points in the course from the individual measuring points $MP_1$-$MP_n$ known mathematic computation methods are used by way of interpolation or, for example, by splines or the like.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for automatically adjusting a headlight range of a motor vehicle having at least one vertically adjustable headlight, the apparatus comprising:
   a sensor device which records at least one of vehicle and environment data, wherein the sensor device comprises a vehicle speed sensor configured to record a vehicle speed;
   an analyzing and control device which analyzes said at least one of the vehicle and environment data and determines, as a function thereof, including as a function of and for any value of said vehicle speed, a vertical road curvature that is independent of vehicle pitch caused by lifting or pitching movements of the vehicle with respect to the road, and outputting control data for controlling the at least one vertically adjustable headlight based on said vertical road curvature, the sensor system not operating in a foresighted manner.

2. The apparatus according to claim 1, wherein the sensor device further comprises at least one of: rate of rotation recording devices for recording a vehicle rate of rotation about a transverse axis of the vehicle and geographic height recording devices or geographic height change recording devices, of the vehicle.

3. The apparatus according to claim 1, further comprising a second sensor device constructed as a second sensor system which operates in a foresighted manner, the second sensor system recording the vertical road curvature.

4. The apparatus according to claim 3, wherein the second sensor device is formed by at least one of: a camera system, a system emitting and processing optical rays, a photosensor device for recording a light density on the road, and a navigation system provided with geographic height information.

5. The apparatus according to claim 1, further comprising an arithmetic logic unit adapted to check for plausibility of the at least one of the vehicle and environment data supplied by the sensor device.

6. The apparatus according to claim 1, further comprising an arithmetic logic unit adapted to check for plausibility of the at least one of the vehicle and environment data supplied by the sensor device.

7. The apparatus according to claim 1, further comprising alignment devices for the sensor device.

8. The apparatus according to claim 7, wherein the alignment devices operate as a function of a control behavior of an existing cornering light of the vehicle.

9. The apparatus according to claim 1, further comprising devices for recording at least one of oncoming vehicles and a vehicle driving ahead of the vehicle.

10. A method for adjusting a headlight range in a motor vehicle having at least one vertically adjustable headlight, the method comprising the acts of:
   sensing information concerning at least one of a current operating condition and environment data of the vehicle, including sensing a vehicle speed;
   analyzing the sensed information, including analyzing the sensed vehicle speed regardless of a magnitude of the vehicle speed, for determining a vertical curvature of a currently traveled road section, wherein the vertical road curvature is independent of vehicle pitch caused by lifting or pitching movements of the vehicle with respect to the road, and outputting control data that is based on said vertical road curvature;
   adjusting the headlight range via an adjusting mechanism to at least one of a defined headlight range and lateral alignment as a function of the control data.

11. The method according to claim 10, wherein the sensing act comprises at least one of the following acts:
   recording a vehicle speed of the vehicle;
   recording a rate of rotation of a vehicle about a transverse axis of the vehicle; and
   recording one of a geographic height and geographic height change of the vehicle.

12. The method according to claim 11, further comprising the act of checking a plausibility of the sensed data via an arithmetic logic unit.

13. An apparatus for automatically adjusting a headlight range of a motor vehicle having at least one vertically adjustable headlight, the apparatus comprising:
   one or more sensors which record at least one of vehicle and environment data, the one or more sensors not operating in a foresighted manner, and wherein the one or more sensors comprise a vehicle speed sensor configured to record a vehicle speed; and
   an analyzing and control device which analyzes said recorded at least one of the vehicle and environment data and calculates, as a function thereof, including as a function of and for any value of said vehicle speed, a vertical road curvature that is independent of vehicle pitch caused by lifting or pitching movements of the vehicle with respect to the road, and to provide control data for controlling the at least one vertically adjustable headlight as a function of the vertical curvature of the road.

* * * * *